(12) United States Patent
Ceschiat et al.

(10) Patent No.: US 9,658,418 B2
(45) Date of Patent: May 23, 2017

(54) FLAME-RETARDANT OPTICAL CABLE FOR AIR-BLOWN INSTALLATION

(75) Inventors: Davide Ceschiat, Milan (IT); Mauro Maritano, Milan (IT)

(73) Assignee: PRYSMIAN S.P.A., Milan (IT)

(*) Notice: Subject to any disclaimer, the term of this patent is extended or adjusted under 35 U.S.C. 154(b) by 0 days.

(21) Appl. No.: 14/420,185

(22) PCT Filed: Aug. 8, 2012

(86) PCT No.: PCT/EP2012/065498
§ 371 (c)(1),
(2), (4) Date: Apr. 30, 2015

(87) PCT Pub. No.: WO2014/023348
PCT Pub. Date: Feb. 13, 2014

(65) Prior Publication Data
US 2015/0226928 A1  Aug. 13, 2015

(51) Int. Cl.
*G02B 6/44* (2006.01)
*G02B 6/46* (2006.01)

(52) U.S. Cl.
CPC ......... *G02B 6/4436* (2013.01); *G02B 6/4433* (2013.01); *G02B 6/4438* (2013.01); *G02B 6/46* (2013.01)

(58) Field of Classification Search
CPC .............................. G02B 6/4436; G02B 6/4438
USPC .......................................... 385/109, 112, 113
See application file for complete search history.

(56) References Cited

U.S. PATENT DOCUMENTS

| 5,748,823 | A | 5/1998 | Nave |
| 8,463,095 | B2* | 6/2013 | Bohler ................. G02B 6/4429 385/100 |
| 2003/0102043 | A1 | 6/2003 | Field |
| 2010/0092139 | A1* | 4/2010 | Overton ............... C03C 25/106 385/110 |
| 2011/0150403 | A1 | 6/2011 | Kachmar et al. |
| 2013/0129290 | A1* | 5/2013 | Keller ................... G02B 6/441 385/112 |

FOREIGN PATENT DOCUMENTS

| WO | WO 03/046074 | 6/2003 |
| WO | WO 2005/040882 | 5/2005 |
| WO | WO 2005/040893 | 5/2005 |

(Continued)

OTHER PUBLICATIONS

Cen-Cenelec, "Optical fibre cables—Part 5-10: Family Specification—Outdoor microduct optical fibre cables, microducts and protected microducts for installation by blowing", (IEC 60794-5-10) pp. 1-33, (Apr. 2014).

(Continued)

*Primary Examiner* — Robert Tavlykaev
(74) *Attorney, Agent, or Firm* — Finnegan, Henderson, Farabow, Garrett & Dunner, L.L.P.

(57) ABSTRACT

An optical cable has a cable core including at least one tube loosely accommodating optical fibers, the at least one tube being accommodated within a jacket embedding at least two strength members, the cable core and the jacket comprising combustible material. A ratio of core combustible material/jacket combustible material is lower than 60 vol %. The jacket is made of a composition having hardness of at least 60 Shore D and a LOI higher than 35%.

16 Claims, 2 Drawing Sheets

(56) References Cited

FOREIGN PATENT DOCUMENTS

| WO | WO 2010/105657 | 9/2010 |
|---|---|---|
| WO | WO 2011/035814 | 3/2011 |
| WO | WO 2011/063221 | 5/2011 |

OTHER PUBLICATIONS

ASTM International, "Standard Test Method for Rubber Property-Durometer Hardness", Designation: D 2240-04, pp. 1-12, (2004).
ASTM International, "Standard Test Method for Measuring the Minimum Oxygen Concentration to Support Candle-like Combustion of Plastics (Oxygen Index)", Designation: D 2863-91, pp. 429-433, (1991).
International Standard, "Tests on electric cables under fire conditions—Part 3-24: Test for vertical flame spread of vertically-mounted bunched wires or cables—Category C", CEI IEC 60332-3-24, pp. 1-25, (2000).
International Search Report from the European Patent Office for International Application No. PCT/EP2012/065498, mailing date Feb. 6, 2013.
Written Opinion of the International Searching Authority from the European Patent Office for International Application PCT/EP2012/065498, mailing date Feb. 6, 2013.

\* cited by examiner

FLAME-RETARDANT OPTICAL CABLE FOR AIR-BLOWN INSTALLATION

CROSS REFERENCE TO RELATED APPLICATION

This application is a national phase application based on PCT/EP2012/065498, filed Aug. 8, 2012, the content of which is incorporated herein by reference.

BACKGROUND OF THE INVENTION

Field of the Invention

The present invention generally relates to optical fiber cables (shortly, optical cables). More specifically, the present invention relates to an optical cable suitable for air-blown installations, capable of housing a high optical fiber count and featuring flame-retardant properties.

Overview of the Related Art

In the last years, it has become important to link end users to existing optical telecommunication networks. Particularly in urban areas, linking the end users to an optical telecommunications network requires the availability of compact optical cables containing a high optical fiber count, suitable to be laid down in already existing cable routing conduits, possibly exploiting efficient deployment techniques such as the air-blowing installation (as for example specified in standard IEC 60794-5-10).

Another important requirement for the optical cables is a good behavior in presence of fire (as specified for example in standard IEC 60332-3C), so as to prevent fire and smoke propagation in houses or, more generally, in premises where persons reside.

A known optical cable for air-blown installation technique, as for example disclosed in WO 2005/040882, has a Multi Loose Tube (MLT) design and a jacket made of a blend of Low Smoke Zero Halogen material (LSZH, also known as LSOH or LSOH or LSFH or OHLS material, i.e. a material typically used for cable jacketing in the wire and cable industry, composed of thermoplastic or thermoset compounds that emit limited smoke and no halogen when exposed to high sources of heat, e.g. flame). The MLT design or configuration comprises a central strength member and a number of tubes (buffer tubes) arranged around the central strength member and loosely accommodating optical fibers.

The MLT configuration, thanks to its symmetrical structure, is considered well fitting air-blown installation.

LSZH blends used for the optical cable jacket generally comprise a polymeric material charged with a flame-retardant inorganic filler. These blends have a LOI (Limiting Oxygen Index)—a parameter indicating the minimum concentration of oxygen, expressed as a percentage, that will support combustion of a polymer; the higher the LOT the better the flame-retardant behavior—typically of about 45÷50%, together with a medium hardness, typically of about 50÷55 Shore D, because of the presence of the inorganic filler/s. As a consequence, polymer blends with high LOT generally has a limited resistance to friction.

Another known design or configuration for optical cables is the Central Loose Tube (CLT) one, as disclosed for example in WO 2005/040883 and WO 2010/105657. The CLT design comprises a number of tubes loosely containing optical fibers to form the so-called optical micro-modules, and a plastic jacket surrounding said tubes, with strength members embedded in the jacket. The presence of strength members, typically two or in two groups diametrically opposed, provides the cable with a preferential bending plane making its structure asymmetric.

WO 03/046074 describes a telecommunication cable comprising a sheath housing at least one transmission element, said sheath comprising a polymeric composition. The addition of inorganic filler to the polymeric composition, particularly in amounts equal to or higher than about 50% by weight with respect to the total weight of the polymeric composition, may confer advantageous flame retardant properties to the polymeric composition. The cable comprises: a plurality of optical sub-units in the form of tubes, each sub-unit encircling a plurality of optical fibers; a polymeric sheath (made from a polymeric composition as above defined) containing the optical sub-unit; a couple of longitudinal reinforcing elements embedded in the polymeric sheath.

WO 2011/035814 relates to optical cables for communications including at least one micro-module. The problem faced in this application is that of reducing the external diameter of the micro-modules for packing them in a number as high as possible within the optical cable sheath. This allows obtaining very compact micro-modules and accordingly optical cables with increased optical fiber density. The optical cable comprises a number of micro-modules forming an optical core, and an outer sheath. Two opposite reinforcing longitudinal elements are preferably arranged in the thickness of the outer sheath. An optical cable may comprise 24, 36 or 60 micro-modules, each comprising 12 optical fibers. The retaining element is generally made of a polymeric material, in particular a thermoplastic material, optionally charged with mineral fillers.

SUMMARY OF THE INVENTION

The Applicant has observed that the MLT structure of known optical cables, despite the above-mentioned advantages for air-blown installation originating from its symmetry, does not allow increasing the number of fibers while maintaining a compact configuration.

In respect of WO 03/046074, the Applicant observes that no suggestion or indication regarding air-blown installations are provided; the cables configuration described in that document is not considered eligible for air-blown installation because of its asymmetrical structure, particularly because of the presence of the couple of longitudinal reinforcing elements embedded in the polymeric sheath. Additionally, an amount of inorganic filler ≥50 wt % imparts the polymeric composition with a relatively low hardness, which makes the optical cable jacket too frail for air-blown installations.

Concerning WO 2011/035814, the Applicant observes that also in this case no suggestion or indication regarding air-blown installations is provided, because of the asymmetrical structure of the cable. Also, no suggestion or indication regarding flame-retardant behavior of the jacket, and no suggestion or indication regarding the composition of the polymeric material of the jacket is provided.

The Applicant has perceived the need of an optical cable having a high number of fibers within a compact configuration, which is suitable for air-blown installations and which has a good flame-retardant behavior.

The Applicant has found that in order to attain such a goal, it is expedient to provide a CLT optical cable, preferably having opposed strength members, with a jacket made of an LSZH material with high hardness and a medium LOI.

In particular, the Applicant has found that the CLT design, besides allowing increasing the number of optical fibers within the cable as compared to the MLT design, shows a good-flame retardant behavior even with a jacket material exhibiting a medium LOI, for example of about 40%.

Also, the Applicant has found that a CLT cable having a preferential bending plane shows a good behavior in air-blown installations provided that the hardness of the jacket is high, e.g., a shore D hardness higher than 60.

Without wishing to be bound to any theory, the Applicant deems that a possible interpretation of the satisfactory behavior of the present CLT cable in presence of a flame—in spite of the limited LOI value—could be ascribed to the CLT configuration. The majority of the combustible material in a cable is polymeric material. The elements made of polymeric material in an optical cable generally act as containment and protection for the optical fibers. In a CLT cable, the tubes housing optical fibers have a reduced thickness, thus are made of a reduced amount of polymeric material, with the respect to the buffer tubes housing optical fibers in a MLT cable. Accordingly, in the optical cable core of a CLT cable there is less combustible material than in the optical cable core of a MLT cable. The reduced volume of combustible material in a CLT cable core could allow a jacket with a medium LOI to be suitable for providing the cable with the sought flame-retardant properties.

According to an aspect of the present invention relates to an optical cable, having a cable core comprising at least one tube loosely accommodating optical fibers, the at least one tube being accommodated within a jacket embedding at least two strength members, the cable core and the jacket comprising combustible material, wherein:

a ratio core combustible material/jacket combustible material is lower than 60 vol %; and the jacket is made of a composition having hardness of at least 60 Shore D and a LOI higher than 35%.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Advantageously, the cable of the invention comprises two strength members. In the present description and claims as "strength member" is intended either a monolithic (for example a rod) or a composite (for example a bunch of wires) longitudinal element.

Preferably each tube loosely accommodates from one to (1) forty-eight (48) optical fibers, more preferably from two (2) to twenty-four (24) optical fibers.

Preferably, the cable of the invention comprises from one (1) to seventy-two (72) tubes, more preferably from one (1) to twenty-four (24) tubes.

Preferably, the tube of the cable of the invention has a wall thickness of from 0.030 mm to 0.125 mm.

Advantageously, the ratio core combustible material/jacket combustible material is equal to or higher than 10 vol %.

The cable jacket can be made of a composition having hardness of 75 shore D at most.

The cable jacket of the invention preferably has a LOI of at least 40%. Said jacket can be made of a composition having a LOI of 45% at most or even of 55% at most. The increasing of the LOI value should be limited bearing in mind the requirement of having a shore hardness of at least 60 shore D.

Preferably, the cable jacket has a wall thickness of from 1.0 mm to 2.0 mm.

The outer diameter of the cable of the invention can be of from 5.0 mm to 12.0 mm depending on the number of optical fibers contained therein. For example, a cable containing from 24 to 72 optical fibers can have an outer diameter of about 6.0 mm; a cable containing 96 optical fibers can have an outer diameter of about 6.5 mm; a cable containing 144 optical fibers can have an outer diameter of almost 8.0 mm; a cable containing 192 optical fibers can have an outer diameter of about 8.5 mm; and a cable containing 288 optical fibers can have an outer diameter of about 10.5 mm.

The cable jacket may be made of a polymeric composition which is a mixture comprising from 70 wt % to 90 wt % with respect to the total mixture weight of one or more polymers; and from 10 phr to 40 phr of one or more flame retardant inorganic fillers.

The polymeric composition of the cable jacket may be a mixture comprising at least one polyethylene polymer.

The polymeric composition of the cable jacket may be a mixture comprising at least one inorganic hydroxide flame retardant filler.

The Shore D hardness of the jacket of the present invention has been evaluated according to the international standard ASTM D2240-04, while LOI has been evaluated according to the international standard ASTM D2863-91.

The flame retardant behavior has been evaluated by conducting flame propagation tests in compliance with IEC 60332-3-24 (2010), category C.

BRIEF DESCRIPTION OF THE DRAWINGS

These and other features and advantages of the present invention will be best understood by reading the following detailed description of an embodiment thereof, provided merely by way of exemplary and non-limitative example. For better intelligibility, the following description should preferably be read while referring to the attached drawings, wherein.

DETAILED DESCRIPTION OF EXEMPLARY INVENTION EMBODIMENTS

Figure 1:
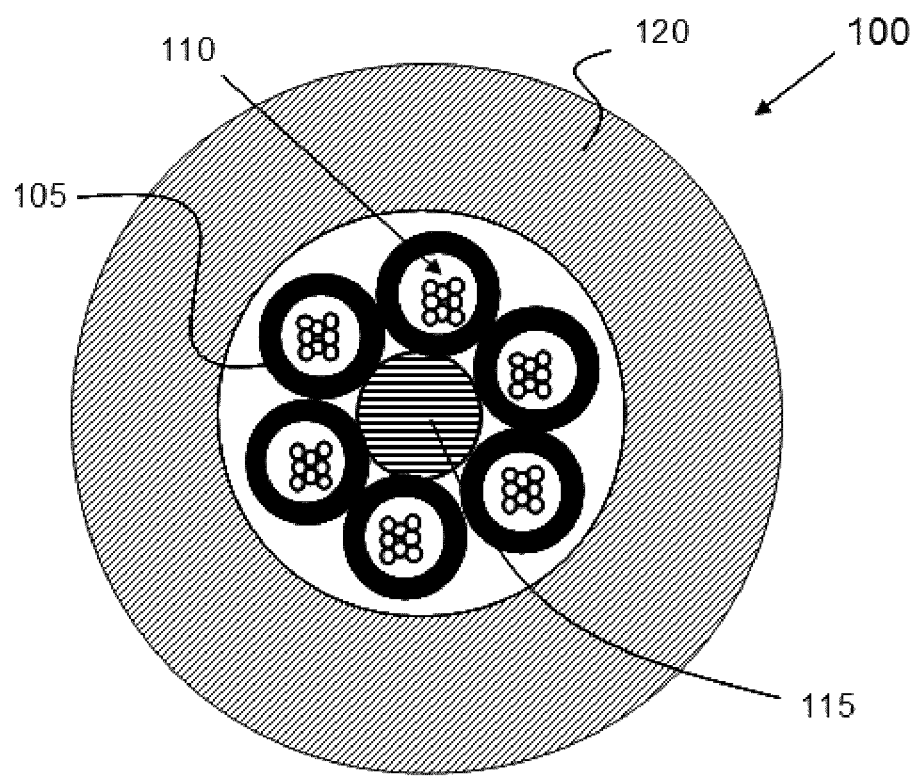
FIG. 1 depicts a typical optical cable with MLT design.

In FIG. 1 a conventional optical cable 100 of the type employed for deploying terrestrial optical networks is shown, particularly of the type used for linking the premises of end users (houses, small offices and the like) to optical telecommunication networks.

The optical cable 100 has an MLT design, with polymeric tubes (so-called "buffer tubes") 105 loosely accommodating respective bunches of optical fibers 110, the buffer tubes 105 being stranded around a central, rigid strength member 115, typically in fiberglass. A sheath or jacket 120 surrounds the whole structure.

When there is the necessity to miniaturize this optical cable design, keeping unchanged the number of optical fibers and their size, it is unavoidable to reduce the thickness of every cable component part, and particularly the thickness of the buffer tubes 105 and the jacket 120. However, such a thickness reduction is limited by the requirements for air-blowing installation and suitable flame-retardant properties.

Figure 2:
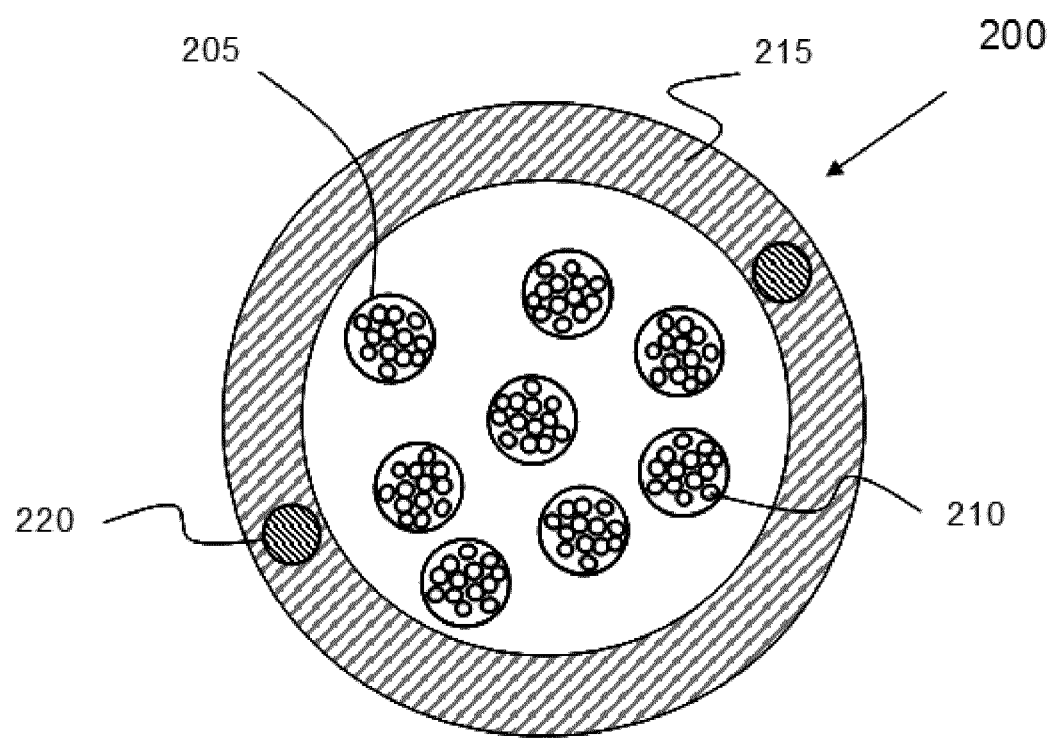
FIG. 2 depicts an optical cable with CLT design according to an embodiment of the present invention.

FIG. 2 depicts an optical cable according to an embodiment of the present invention.

The optical cable 200 has a CLT-like design and comprises a number of relatively thin plastic tubes 205 (thinner than the buffer tubes 105 of the MLT design; for example, the tubes 205 may have a wall thickness of from 0.030 mm to 0.125 mm) containing loosely-placed optical fibers 210, and a flame-retardant polymeric jacket 215 surrounding said tubes. Strength members 220 (two, in the shown example, arranged diametrically opposite) are embedded in jacket 215, preferably completely embedded therein. For example, each tube 205 may accommodate from 1 to 48 optical fibers; the optical cable may contain from 1 to 72 tubes 205.

The flame-retardant polymeric jacket of the cable of the invention is based on halogen-free polymeric materials charged with one or more flame retardant inorganic filler.

Examples of polymeric material suitable for the present jacket are high density polyethylene (HDPE), medium density polyethylene (MDPE), low density polyethylene (LDPE), linear low density polyethylene (LLDPE), ultra low density polyethylene (ULDPE); polypropylene; high and low density poly-1-butene; poly-4-methyl-1-pentene; ultra-low-molecular weight polyethylene; ethylene-based ionomers; poly-4-methyl-1-pentene; ethylene propylene copolymers; ethylene-propylene-diene copolymers (EPDM); copolymer of ethylene and/or propylene with other copolymerizable monomers such as ethylene-1-butylene copolymer, ethylene-vinyl acetate copolymer (EVA), ethylene-methyl acrylate copolymer (EMA), ethylene-butyl acrylate copolymer (EBA), ethylene-ethyl acetate copolymer (EEA), propylene-4-methyl-1-pentene copolymer, ethylene-vinyl alcohol copolymer; ethylene acrylic elastomers such as, for example, ethylene-methyl acrylate-acrylic acid terpolymers; or mixtures thereof. Polyethylenes are preferred.

Suitable flame-retardant inorganic filler for the jacket polymeric material can be, for example, hydroxides, hydrated oxides, salts or hydrated salts of metals, in particular of calcium, magnesium, aluminum, or mixtures thereof. Aluminium hydroxide and magnesium hydroxide, either synthetic or natural (brucite) are preferred, the synthetic magnesium hydroxide being more preferred.

The inorganic filler suitable for the invention may be advantageously used in the form of coated particles. Preferred coating materials are saturated or unsaturated fatty acids containing from 8 to 24 carbon atoms, or metal salts thereof, such as, for example: oleic acid, palmitic acid, stearic acid, isostearic acid, lauric acid; magnesium or zinc stearate or oleate; or mixtures thereof.

The flame retardant polymeric composition can be a mixture comprising from 70 wt % to 90 wt % with respect to the total mixture weight of one or more polymers selected from the list above; and from 10 phr to 40 phr (per hundred rubber) of one or more flame retardant inorganic fillers selected from the list above. The content of flame retardant fillers should be lower than 50 wt %.

As known to the skilled person, the LOI value of a polymeric mixture depends on the kind and amount of inorganic flame retardant filler, on the kind and grade of polymeric material and on the presence of additives such as inert fillers (e.g. silica), coating materials and ceramifying nanofillers.

The strength members embedded in the jacket can be made of dielectric material, such as rods of glass or aramid fibres reinforced resin, or, alternatively, they can be made of metal, for example in form of wires or strands of metallic wires, for example brass plated steel wires.

Differently from the case of an optical cable having an MLT design, the tubes 205 mainly have a function of facilitating the identification of the optical fibers, more than a mechanical resistance function (in the MLT design, the buffer tubes 105 ensure resistance against squeezing, and are scarcely deformable with temperature increase). The longitudinal strength of the optical cable is guaranteed by the strength members 220.

The Applicant has found that it is possible to obtain an optical cable that is compact and that exhibits a good behavior in air-blown installation and good flame-retardant properties, by properly designing the optical cable core, i.e. the part of the optical cable 200 within the jacket 215, reducing the amount of combustible material in the core, and selecting a proper material for the jacket 215.

Hereinafter, some examples of optical cable designs that were tested by the Applicant are reported in the following Table 1.

TABLE 1

| Cable | 1 | 2 | 3* | 4* | 5* | 6* | 7* | 8* | 9* |
|---|---|---|---|---|---|---|---|---|---|
| Cable design | CLT | CLT | CLT | MLT | MLT | MLT | MLT | MLT | CLT |
| # of optical fibers | 72 | 144 | 144 | 72 | 72 | 72 | 144 | 144 | 144 |
| Cable diameter (mm) | 6.2 | 7.8 | 7.8 | 7.3 | 7.3 | 9.2 | 9.3 | 7.6 | 7.8 |
| Core/jacket ratio (vol %) | 36 | 54 | 54 | 85 | 85 | 37 | 128 | 93 | 54 |
| Jacket LOI (%) | 40 | 40 | 45-50 | 45-50 | 40 | 40 | 45-50 | 45-50 | 35 |
| Jacket Shore D | 63 | 63 | 50-55 | 50-55 | 63 | 63 | 50-55 | 50-55 | 63 |
| Fire propagation test | passed | passed | passed | passed | not passed | passed | — | passed | not passed |
| Air-blown installation test | passed | passed | not passed | not passed | passed | not passed | not passed | not passed | passed |

Cables 1 and 2 are according to the invention while cables 3-9 (marked with an asterisk) are comparative ones. Unless otherwise indicated, all of the tested cables had a jacket made of a polyethylene material charged with an inorganic hydroxide flame retardant filler; and the optical fibers had an outer diameter of 250 μm each.

Tests of fire propagation and air-blown installation were carried out according to the international standards IEC 60332-3C and IEC 60794-5-10, respectively.

Comparative cables 4-8 were of MTL design. Compared with CLT cables containing the same number of optical fibers, these MLT cables, just because of the design thereof, had a greater diameter, excepting for comparative cable 8 because the optical fibers contained therein had an outer diameter of 200 μm each. None of comparative cables 4-8 passed both the tests in question.

In particular, comparative cable 4 had core/jacket ratio higher than 60 vol % (the core contained more combustible material than set forth by the boundaries of the invention) and passed the fire propagation test thanks to the jacket made of a material with a high LOI, but the same jacket material, having a low hardness (lower than 60 shore D), compromised the outcome of the air-blown installation test.

Comparative cable 5 had a jacket made of a material with a low LOI according to the invention and did not pass the fire propagation test because the core/jacket ratio was too high, indicating that too much combustible material was present in the core.

Comparative cable 6 had the same jacket material of comparative cable 5 (low LOT, high hardness) and was able to pass the fire propagation test because the jacket had a thickness greater than that of cable 5. In fact, cable 6 has a greater diameter than cable 5 (9.2 mm vs 7.3 mm) and a core/jacket ratio much lower than cable 5 indicative of a greater volume of combustible material was present in cable jacket. But just because of such greater diameter, comparative cable 6 could not comply with the dimensional request for cables containing 72 optical fibers and did not pass the air-blown installation test.

Comparative cable 7 had the same jacket material of comparative cable 4 (high LOI, low hardness), but a greater diameter (9.3 mm vs 7.3 mm) in view of the higher number of optical fibers (6 buffer tubes containing 24 optical fibers vs 6 buffer tubes containing 12 optical fibers) and, accordingly, could not pass the air-blown installation test due to dimension and jacket hardness issues.

Comparative cable 8 had the same jacket material of comparative cable 4 (high LOI, low hardness), a number and distribution of optical fibers like comparative cable 7, but a reduced diameter (7.6 mm vs 9.3) in view of the special optical fibers contained therein. Cable 8 passed the fire propagation test, but not the air-blown installation test due to jacket hardness issues.

Comparative cables 3 and 9 have a CLT design. Comparative cable 3 had core/jacket ratio according to the present invention (lower than 60 vol %), but a jacket with a high LOI and, accordingly, a low hardness. This cable passed the fire propagation test, but not the air-blown installation test due to jacket hardness issues.

Comparative cable 9 had a jacket made of a polyethylene material charged with calcium carbonate $CaCO_3$. The core/jacket ratio and the jacket hardness of comparative cable 9 were according to the present invention (lower than 60 vol % and higher than 60 Shore D, respectively), but the jacket had low LOI. This cable did not pass the fire propagation test.

Cable 1 and 2 of the invention are characterized by a CLT configuration with a core/jacket ratio lower than 60 vol %. Though the polymeric jackets have a low LOI, both the cables passed the fire propagation test. Both the cables passed the air-blown installation test, too.

From the data set forth in Table 1 it is apparent that the peculiar geometrical configuration and the material of the jacket taught by the invention, cannot independently provide the sought solution, but, when properly combined, allow obtaining an optical cable satisfying the requirement of suitable flame-retardant behavior and air-blown installation. In particular, it is pointed out that considering cable 2, even with the increase of the number of optical fibers from 72 (as in cable 1) to 144, the external diameter of the optical cable (7.8 mm) is compatible with the conduits where the optical cable is to installed.

The invention claimed is:

1. An optical cable for air-blown installation, comprising:
    a cable core comprising at least one tube loosely accommodating optical fibers; and
    a single outermost jacket embedding at least two strength members and surrounding the at least one tube in a central-loose-tube configuration, wherein:
        the cable core and the jacket comprise combustible material, and a ratio of core combustible material/jacket combustible material is lower than 60 vol %;
        the cable has an outer diameter in a range from 6.0 mm to 10.5 mm and contains optical fibers in a range from 24 to 288; and
        the jacket is made of a low smoke zero halogen material having hardness of at least 60 Shore D and a LCI higher than 35% and at most 45%.

2. The optical cable according to claim 1, wherein each tube loosely accommodates from 1 to 48 optical fibers.

3. The optical cable according to claim 1, comprising from 1-72 tubes.

4. The optical cable according to claim 1, wherein the tube has a wall thickness of from 0.030 mm to 0.125 mm.

5. The optical cable according to claim 1, wherein a ratio of core combustible material/jacket combustible material is equal to or higher than 10 vol %.

6. The optical cable according to claim 1, wherein the cable jacket is made of a composition having hardness of 75 shore D at most.

7. The optical cable according to claim 1, wherein the cable jacket is made of a composition having a LOI of at least 40%.

8. The optical cable according to claim 1, wherein the cable jacket has a wall thickness of from 1.0 mm to 2.0 mm.

9. The optical cable according to claim 1, wherein the cable jacket is made of a polymeric composition which is a mixture comprising from 70 wt % to 90 wt % with respect to the total mixture weight of one or more polymers: and from 10 phr to 40 phr of one or more flame retardant inorganic fillers.

10. The optical cable according to claim 1, wherein the cable jacket is made of a polymeric composition which is a mixture comprising at least one polyethylene polymer.

11. The optical cable according to claim 1, wherein the cable jacket is made of a polymeric composition which is a mixture comprising at least one inorganic hydroxide flame retardant filler.

12. The optical cable according to claim 1, wherein the optical fibers are between 24 and 72 in number and the outer diameter is about 6.0 mm.

13. The optical cable according to claim 1, wherein the optical fibers are 96 in number and the outer diameter is about 6.5 mm.

14. The optical cable according to claim 1, wherein the optical fibers are 144 in number and the outer diameter is about 8.0 mm.

15. The optical cable according to claim 1, wherein the optical fibers are 192 in number and the outer diameter is about 8.5 mm.

16. The optical cable according to claim 1, wherein the optical fibers are 288 in number and the outer diameter is about 10.5 mm.

* * * * *